May 4, 1948. J. MORKOSKI 2,440,779
LIFT MECHANISM FOR IMPLEMENTS
Filed May 15, 1944 5 Sheets-Sheet 1

Inventor:
James Morkoski.
By Paul O. Pippel
Atty.

May 4, 1948. J. MORKOSKI 2,440,779
LIFT MECHANISM FOR IMPLEMENTS
Filed May 15, 1944 5 Sheets-Sheet 3

Inventor:
James Morkoski.
By Paul O Pippel
Atty.

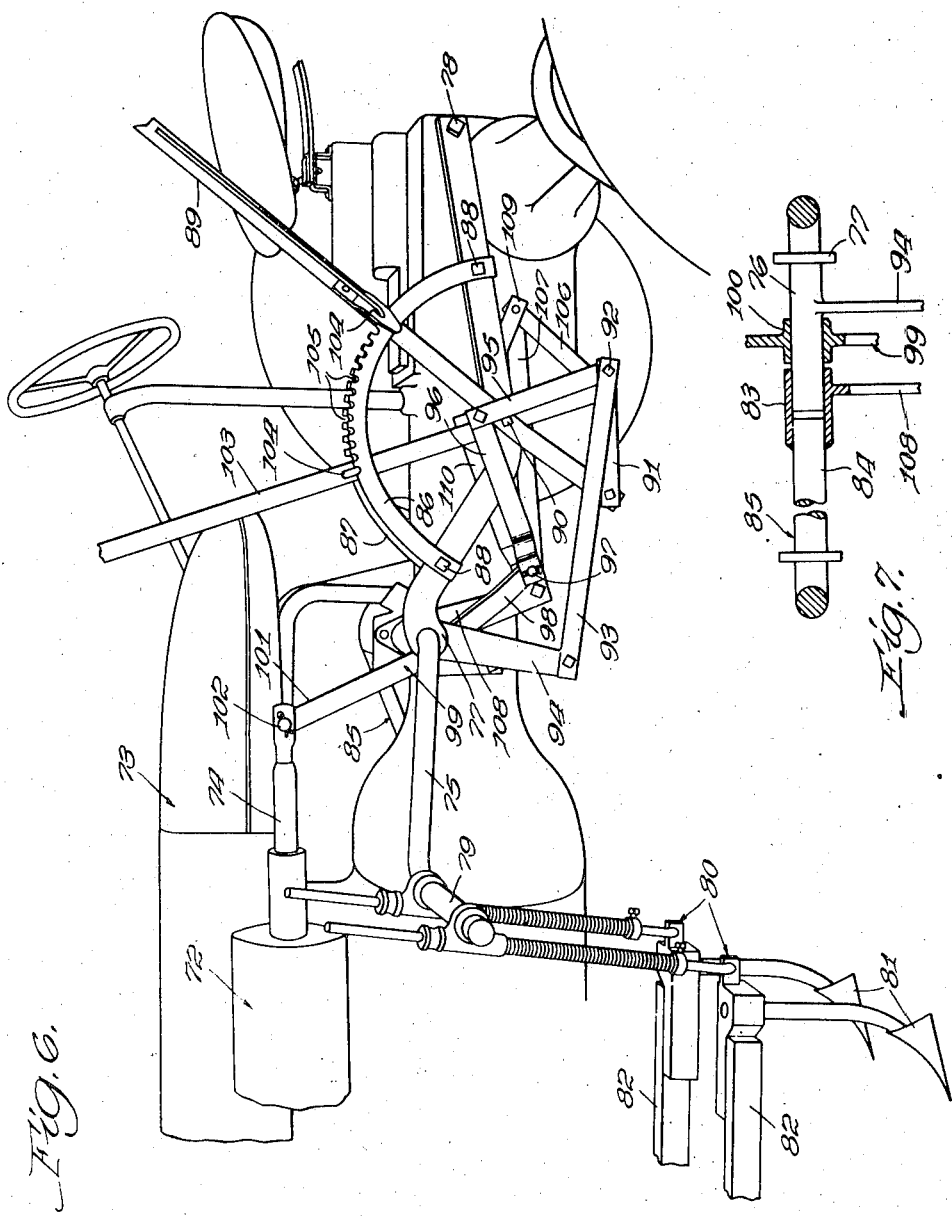

Patented May 4, 1948

2,440,779

UNITED STATES PATENT OFFICE 2,440,779

LIFT MECHANISM FOR IMPLEMENTS

James Morkoski, Canton, Ill., assignor to International Harvester Company, a corporation of New Jersey Application May 15, 1944, Serial No. 535,649

9 Claims. (Cl. 97—73)

This invention relates to agricultural implements utilizing power lift mechanism for moving the earth-working tools to and from operating position.

In such agricultural implements as previously constructed, power means has been provided for moving the working tool to and from operating position, and a manually operated mechanism has been provided for adjusting the operating depth thereof. However, the height to which the lifting mechanism has raised the working tools has varied with the variation in operating depth thereof. Thus, if the tools had been adjusted to operate at a shallow depth in the ground, the power lift mechanism would raise the tools to a height above the ground that would be sufficient to clear obstacles; while if the tools were adjusted to operate at a considerable depth, the range of movement initiated by the lift mechanism would be the same, but the tools would be raised to a height above the ground that would not provide sufficient clearance, and trash was frequently accumulated.

Numerous attempts have been made in the past to devise a mechanism for lifting earth-working tools to a constant or uniform height above the ground where the operating depth thereof is variable. However, such devices as have been attempted have failed to do more than approximate a constant height lift, and due to their inefficiency and, in many cases, complexity, have been commercially unsuccessful.

Therefore, an object of the present invention is the provision of a novel power lift mechanism by which the tools may be raised to a uniform height above the ground for transport purposes and the like, irrespective of the adjusted depth of operation thereof.

Another object of the invention is the provision of what may be termed a constant height lift for agricultural implements which is characterized by simplicity, and which will cause the working tools to rise to an absolute constant height above the ground regardless of the depth of operation thereof.

The invention is described primarily as applied to a trail-behind moldboard plow wherein the lifting power is supplied by the rotation of a land wheel mounted on a crank axle supported by the plow frame and operating in conjunction with a clutch to vertically move the plow frame.

Other objects and advantages of this invention will appear from the following detailed description when read in conjunction with the accompanying drawings, wherein.

Figure 1:
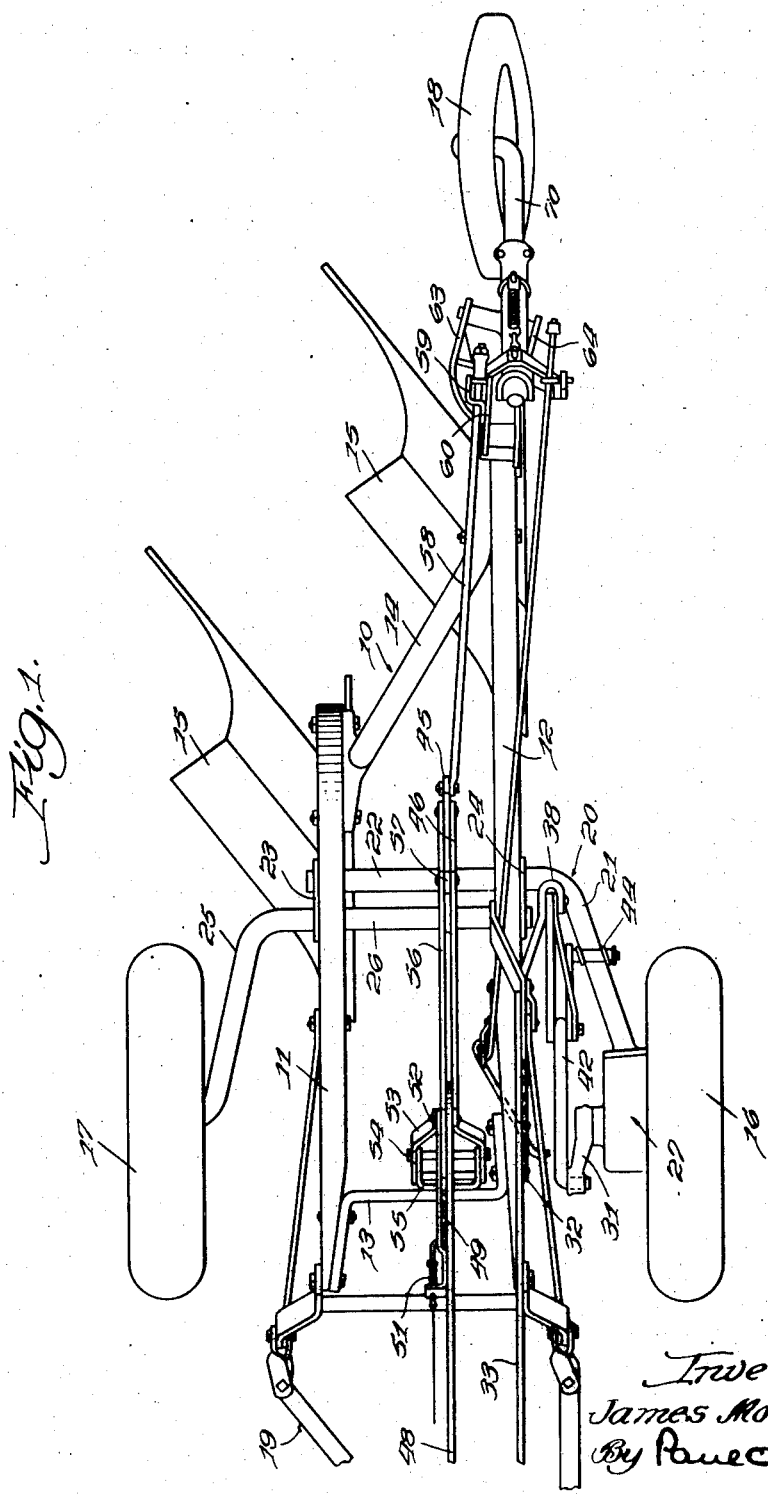
Figure 1 is a plan view of a plow embodying the features of the present invention.

Referring to the drawings, it will be noted that the numeral 10 designates generally the frame of a two-bottom plow illustrating the features of the present invention. This plow frame comprises generally two longitudinally extending, laterally spaced beams 11 and 12 connected at their forward ends by an angle brace 13. It will be observed that beam 12 on the land side of the plow extends for some distance rearwardly of beam 11, and the two beams are braced at their rear ends by a diagonal brace 14. The rear ends of beams 11 and 12 curve downwardly and support at their lower ends plow bottoms 15.

Frame 10 is supported by a land wheel 16, a front furrow wheel 17, and a rear furrow wheel 18. To the forward ends of the beams 11 and 12 is connected a hitch structure generally indicated at 19, by which the plow may be attached to and drawn by a tractor or other vehicle in a manner well known in the art.

Land wheel 16 is supported upon a land axle 20 having a crank 21 and a transverse portion 22 rotatably mounted in bearing brackets 23 and 24 affixed respectively to the beams 11 and 12. Furrow wheel 17 on the opposite side of the plow frame from land wheel 16 is mounted upon a crank axle 25 having a transverse portion 26 rotatably mounted in brackets 23 and 24.

The plow is moved vertically to and from operating position by a power lift mechanism including a power lift clutch indicated at 27, which is preferably of a construction such as that shown in the United States Patent to Morkoski No. 2,330,303 to which reference may be had for the details thereof. This clutch is enclosed in a housing affixed to the lower end of crank 21 and operates in conjunction with a stub shaft 28 upon which land wheel 16 is journaled to raise and lower the plow in a manner hereinafter more fully described. The clutch is tripped by a lever 29 having a rope 30 attached to its upper end and extending forwardly to a position accessible to the operator of the tractor or other vehicle. The clutch comprises generally a constantly rotating member driven by traction of the land wheel 16 and an intermittently rotatable member adapted to be rotated with the land wheel upon engagement of the clutch by tripping the lever 29. A crank arm 31 rotates with the intermittently rotatable member one-half revolution each time the clutch is engaged. On the beam 12 is mounted a quadrant 32, and adapted for movement thereover is a lever 33, pivoted at 34 (see Figure 3) upon a bracket 35 affixed to the beam 12. The usual detent mechanism 36 is provided for engagement with teeth 37 on the quadrant 32. Forming a part of the lever 33 is a triangular arrangement comprising an arm 38 pivoted upon the bracket 35 and 34 and a strap 39 connecting the outer end of arm 38 to the lever arm 33 at a point spaced from the pivot 34. The outer end of arm 38 is bent back upon itself and provided with a pin 40 for attachment thereto of arm 39. Pin 40 likewise supports the end of a link 41 for pivotal movement. The other end of link 41 is pivoted at 41ª to a link 42, which is pivotally connected at its other end to the crank arm 31. Likewise connected to the links 41 and 42 at their point of pivotal connection is a link 43, the other end of which is pivoted upon a lug 44 secured, as by welding, to crank 21 at a point between its pivot axis upon the frame and the axis of the land wheel 16.

Figure 3:
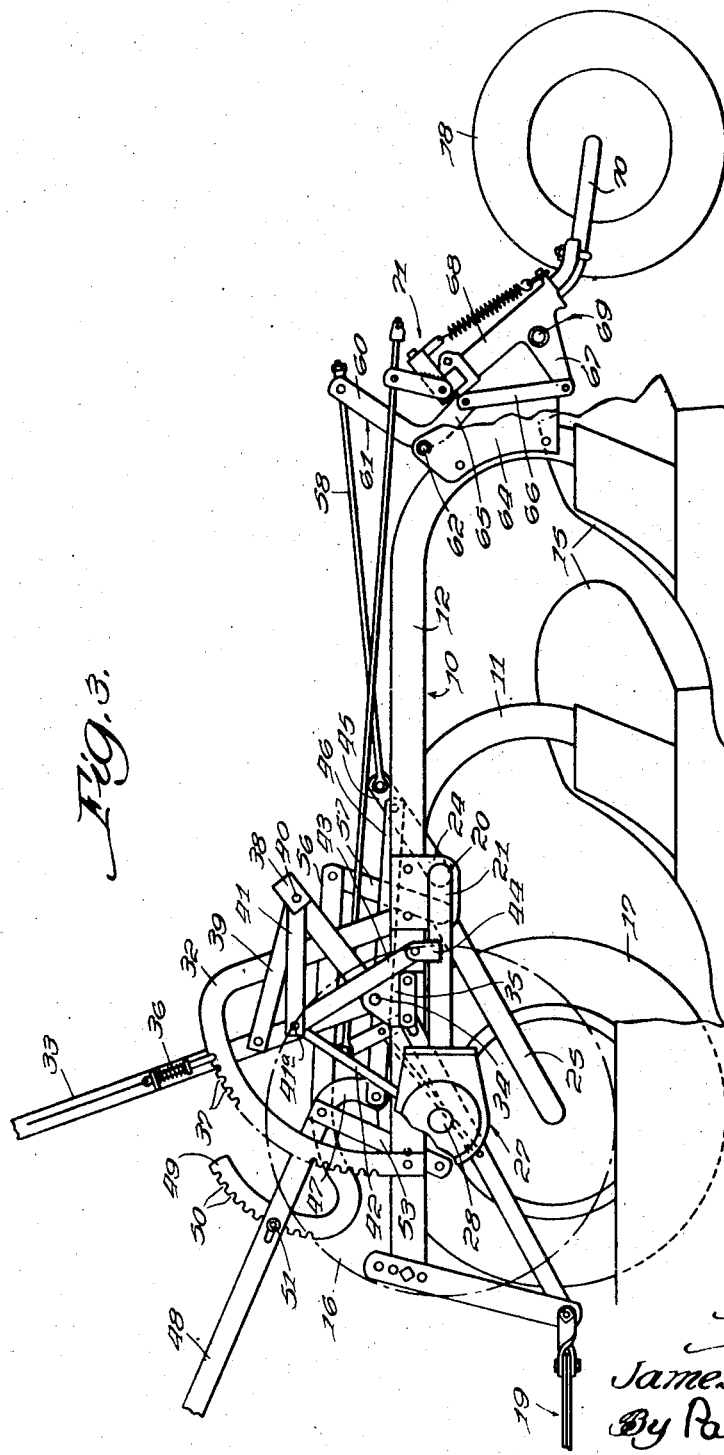
Figure 3 is a view similar to Figure 2 but showing the plow in operating position.
Figure 4:
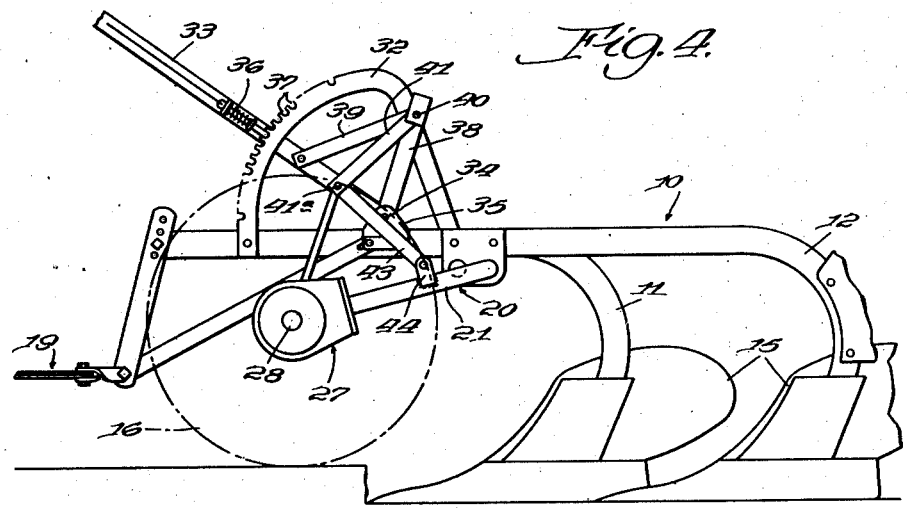
Figure 4 is a view in side elevation with certain parts removed for clarity and showing the plow in position for shallow plowing.
Figure 5:
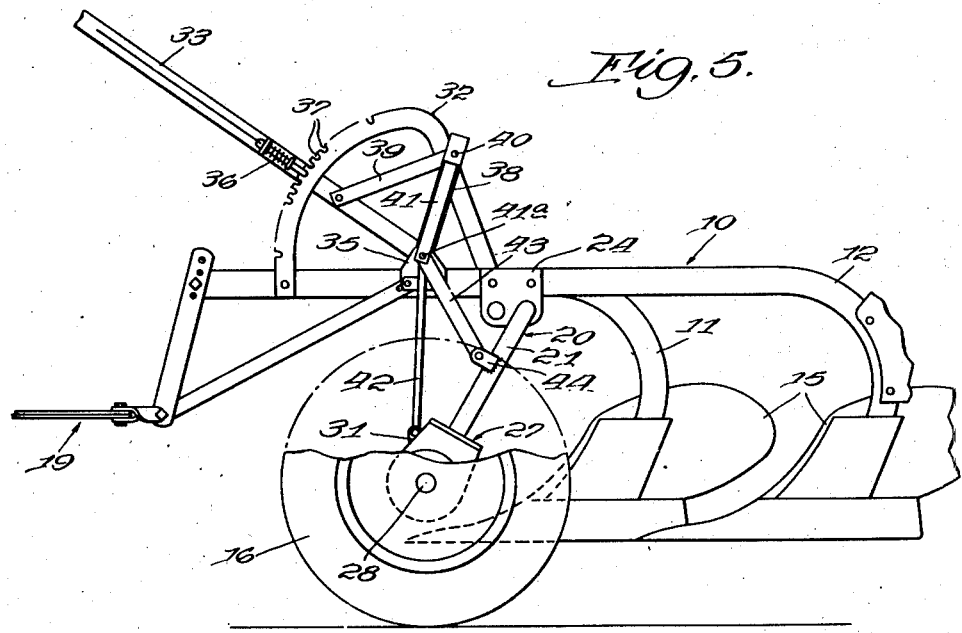
Figure 5 is a view similar to Figure 4, showing the plow in raised position.

It will be noted that the effective length of link 41 is equal exactly to the distance between the pivot 40 and the point of pivot 34 of lever 33 upon the bracket 35, the reason for which will hereinafter become clear. It will be noted that in Figure 3 the plow is in operating position and is set to operate at considerable depth in the soil. Adjustment of depth of operation of the plow bottoms 15 may be made by manipulating lever 33 over the quadrant 32. In Figure 3 the lever is at the height of its stroke, and the plow bottom 15 may be considered to be at the lowest depth of operation. Upon movement of the lever 33 over the quadrant 32, the depth of operation may be varied, for example, as illustrated in Figure 4, where the plow bottoms are shown as operating at a relatively shallow depth. Power for raising the plow to a transport position is supplied by the land wheel 16 effective through engagement of the clutch 27 by tripping the lever 29. The clutch 27 thus becomes operative by the rotation of crank arm 31, operating through links 41, 42, and 43 to swing the crank 21, carrying the land wheel 16, in a vertical direction, thus raising the frame.

Figure 2:
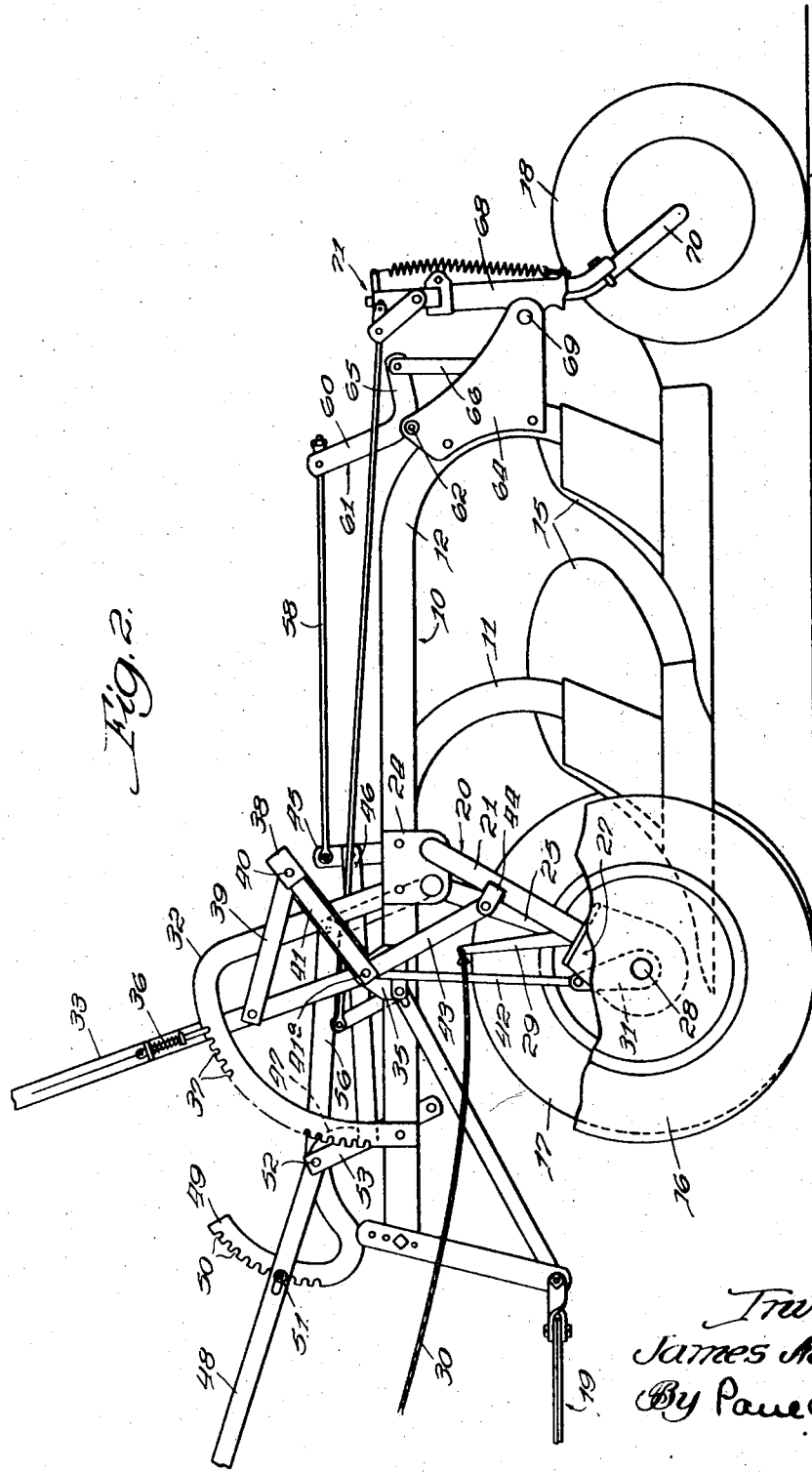
Figure 2 is a view in side elevation of the plow shown in Figure 1 and showing the plow in raised position.

In Figure 2 the plow is shown in its raised position, and it will be noted that the pivot point 41ª is in axial alinement with the pivot 34 of lever 33 upon the frame. At this point the plow has reached its maximum height for transport above the ground. Likewise it will be noted that now movement of lever 33 is ineffective to swing crank 21 with respect to the frame and thereby change the height of the plow bottoms 15 above the ground. The lever 33 now may be moved to any desired position on the quadrant; the link 41 will merely pivot with the lever, and the pivot point 41ª will remain in axial alinement with the pivot 34. If the lever 29 is now again tripped to engage the clutch 27, the point of pivot 41ª will be displaced from its alined relation with respect to the pivot point 34, and the plow will again descend to the position shown in Figure 3. However, if it is desired to set the plows to operate at a lesser depth, the lever 33 may be moved over the quadrant 32 in a counter-clockwise direction, as shown in Figure 4, to raise the plow bottoms 15. In this position of the plow bottoms, therefore, link 41 constitutes an effective arm of force for adjusting the position of the frame with respect to the land wheel 16. Again viewing Figure 4 with the position of lever 33 as shown therein, if it is desired to raise the plow to transport position, the clutch 27 is again engaged to swing the crank 21 with respect to the frame. When the point of pivot 41ª reaches axial alinement with the pivot point 34, the plow will have reached its maximum height above the ground, which, it may be noted, is the same height as is shown in Figure 2 wherein the position of the lever 33 indicates that the plow bottoms are set for their maximum depth of operation when the plow is lowered to working position. The lever 33 is now again ineffective to move the crank 21 with respect to the frame, and the link 41 merely pivots about the point 41ª. Upon actuating the clutch again, however, to lower the tools to the shallow working position for which the lever 33 has been set, the point 41ª is displaced from alinement with respect to the point 34 and moves away from the pivot axis of the crank axle 20 upon the frame of the plow until the working position shown in Figure 4 is reached. The lever 33 is now again effective to vary the depth of operation of the plow. As the clutch is again engaged and crank 21 swings downwardly to raise the plow frame, the point 41ª again approaches the pivot axis of the axle 20 upon the frame until it reaches a position of alinement with the pivot 34, whereupon the plow will have again been raised to exactly the same height above the ground as was achieved when the plow was raised from its lowest depth position shown in Figure 3 to the raised position shown in Figure 2.

It should now be clear that a mechanism has been provided by which the plow may be raised to an absolute constant height above the ground for transport purposes or the like, irrespective of variations in the depth of operation thereof.

Lifting movement of the crank 21 is transmitted to the furrow wheels 17 and 18 by a mechanism now to be described. Secured to the transverse portion 22 of crank axle 20 is an upstanding arm 45 having pivoted near its upper end a forwardly extending strap 46. The forward end of strap 46 is pivoted upon a bent portion 47 at the lower end of a lever 48. Lever 48 is arranged to move over a quadrant 49 having teeth 50 therein adapted to be engaged by a detent mechanism 51 of conventional form. Lever 48 is pivoted at 52 between the upwardly extending arms of a member 53 (see Figure 1), the lower end of which is pivoted upon a bolt 54 mounted in the arms of a bracket 55 affixed to the brace 13. Member 53 thus has pivotal movement upon bolt 54 and may be rocked forwardly and rearwardly carrying with it the quadrant 49. Quadrant 49 is provided with an extension 56, the rear end of which is pivoted upon the upper end of an arm 57 (see Figure 3), secured to the transverse portion 26 of crank axle 25 supporting the furrow wheel 17. Thus rocking movement of crank axle 20 is transmitted through arm 45 and link 46 to the quadrant 49 and back again to arm 57 mounted upon the axle 25 to rock axle 25 simultaneously with the rocking of axle 20. Manual adjustment of the furrow wheel 17 vertically for the purpose of leveling the plow is effected by the lever 48.

Pivoted upon the upper end of arm 45 is a rearwardly extending connecting rod 58, the rear end of which is slidable in a bracket 59 in the upper end of an arm 60 of a bell-crank 61 pivoted upon a bolt 62 extending between plates 63 and 64 affixed to the rear end of beam 12. Another arm 65 of bell-crank 61 is connected by a link 66 (see Figure 3) to the forwardly extending projection 67 of a vertically extending sleeve 68 pivoted upon a shaft 69 mounted between the plates 63 and 64. Rotatably mounted in the sleeve 68 is an axle 70 having a rearwardly bent portion supporting the rear furrow wheel 18. Axle 70 thus has rocking movement about the shaft 69 as a pivot. Movement of crank axle 20 is, therefore, transmitted through connecting rod 58 to bell-crank 61 and axle 70 to effect rocking movement thereof, for the purpose of raising and lowering the plow with respect to the rear furrow wheel 18.

A locking mechanism generally indicated at 71 is provided for preventing rotation or castering of the rear furrow wheel 18 under certain conditions. This mechanism forms no part of the present invention, and for the details thereof reference may be had to United States Patent No. 2,407,094, issued September 3, 1946.

Having now described the invention, it should be understood that modifications may be made therein without departing from the spirit of the invention or the scope of the appended claims.

What is claimed is:

1. In a power lift for agricultural implements, in combination, a frame, a crank axle pivoted on the frame, a supporting wheel on the axle, a power lift clutch for pivoting the axle to move the wheel with respect to the frame, a crank operated by the clutch, depth-adjusting means including a lever arm pivoted on the frame, a link pivoted at one end on the lever arm at a point spaced from its pivot on the frame, second and third links each pivoted at one end to the other end of said first link, means connecting said axle and said crank to said second and third links respectively, the pivotal connection of said first link to said second and third links being in axial alinement with the point of pivot of said lever arm upon said frame when the implement is in raised position.

2. In a power lift for agricultural implements, in combination, a frame, a crank axle pivoted on the frame, a supporting wheel on the axle, a power lift clutch for pivoting the axle to move the wheel with respect to the frame, a crank operated by the clutch, depth adjusting means including a lever arm pivoted on the frame, a link pivoted at one end of the lever arm at a point spaced from its pivot on the frame, second and third links each pivoted at one end to the other end of said first link, means connecting said axle and said crank to said second and third links, respectively, the point of pivot of said first link to said second and third links and the point of pivot of said lever arm upon said frame being equidistant from the pivot axis of said crank axle upon said frame when the implement is in raised position.

3. In a power lift for agricultural implements, in combination, a frame, a crank axle pivoted on the frame, a supporting wheel on the axle, a power lift clutch on the axle for pivoting the axle to move the wheel with respect to the frame, a crank operated by the clutch, linkage connecting the crank and the axle comprising angularly disposed links pivotally joined at one end, depth-adjusting means including a lever arm pivoted on the frame, a link pivoted at one end upon the lever arm at a point spaced from its pivot on the frame and at its other end upon the juncture of said first-mentioned links, said juncture coinciding with the point of pivot of said lever arm upon said frame when the implement is in raised position.

4. In a power lift for agricultural implements, in combination, a frame, a crank axle pivoted on the frame, a supporting wheel on the axle, a power lift clutch on the axle for pivoting the axle to move the wheel with respect to the frame, a crank operated by the clutch, linkage connecting the crank and the axle comprising angularly disposed links pivotally joined at one end, depth-adjusting means including a lever arm pivoted on the frame, a link pivoted at one end upon the lever arm at a point spaced from its pivot on the frame and at its other end upon the juncture of said first-mentioned links, said pivot and said juncture being equidistant from the pivot axis of said crank axle upon said frame when the implement is in raised position.

5. In a power lift for agricultural implements, in combination, a frame, a crank axle pivoted on the frame, a supporting wheel on the axle, a power lift clutch for pivoting the axle to move the wheel with respect to the frame, a crank operated by the clutch, manual depth-adjusting means including a lever arm pivoted on the frame, and means for raising the implement to the same height above the ground irrespective of the adjusted operating depth thereof, comprising a pair of links pivotally connected together at one end, the other end of one link being connected to said crank and the other end of said other link being connected to said axle, a third link pivotally connecting said links to said lever arm at a point removed from the pivot of the lever arm upon the frame, the pivotal connection of said third link to said first-mentioned pair of links being in axial alinement with the pivot of the lever arm upon the frame when the implement is in raised position, whereby movement of said lever arm is effective only to swing said third link about its pivotal connection to said first-mentioned pair of links, said third link becoming an arm of force only when the implement is between raised and lowered positions.

6. In a lifting arrangement for an agricultural implement, a frame, a crank axle on the frame, a wheel carried by the axle and swingable to move the frame with respect to the wheel between transport and operating positions, a clutch between the wheel and the frame and deriving power from the wheel to swing said axle, linkage operatively connecting the clutch and the axle and including a pair of pivotally connected link members, one of which is operatively connected to the clutch and the other to the axle, an adjustable lever arm pivoted on the frame, and a link connecting said linkage and said lever arm for regulating the operating depth of said implement, the point of connection of said link to said linkage being in axial alinement with the pivot of said lever arm on the frame when the implement is in transport position, in which position adjustability of the lever arm is ineffective to alter the relationship between the frame and its supporting wheel.

7. In a power lift for agricultural implements, in combination, a frame, a crank axle pivoted on the frame, a supporting wheel on the axle, power lift means for pivoting the axle to move the wheel with respect to the frame, depth-adjusting means including a movable member pivoted on the frame, a link pivoted at one end on the member at a point spaced from its pivot on the frame, extensible means actuable by said power means and pivotally connecting the other end of said link to said axle at a point adjacent its wheel axis, the effective length of said link being equal to the distance between its pivot on said member and the pivot of said member on the frame.

8. In a power lift for agricultural implements, in combination, a frame, a supporting wheel, a crank axle pivoted on the frame for swinging movement to move the wheel with respect to the frame, depth-adjusting means including a movable member pivoted on the frame, a first link pivoted on the member at a point spaced from its pivot on the frame and having an effective length equal to the distance between said pivots, a second link connected to the other end of said first link and to the crank axle at a point spaced from the axis of said wheel, extensible means connecting the crank axle adjacent said wheel axis to the point of connection of said first link to said second link, and power means for actuating said extensible means to swing said axle.

9. In a lifting arrangement for a trail-behind plow, a tool-carrying frame, a crank axle mounted on the frame and swingable with respect thereto, a wheel carried by the axle, power means associated with the axle and swingable therewith for moving the frame between operating and transport positions, means operable independently of said power means for adjusting the operating depth of the plow and including a lever arm pivoted on the frame, means connecting said power means to said lever arm and reacting therethrough to move the frame, comprising a link pivoted on the lever arm at a location spaced from the pivot of the lever on the frame and means pivotally connecting the power means to said link at a location spaced from the pivot of the link on the lever arm a distance equal to that between the pivot of the lever arm and the pivot of the link.

JAMES MORKOSKI.

REFERENCES CITED

The following references are of record in the file of this patent:

UNITED STATES PATENTS

| Number | Name | Date |
|---|---|---|
| 1,865,431 | Boda | July 5, 1932 |
| 1,928,955 | Strandlund | Oct. 3, 1933 |
| 2,197,369 | Strasser et al. | Apr. 16, 1940 |
| 2,298,553 | Ego | Oct. 13, 1942 |